(12) United States Patent
Dehner, Jr. et al.

(10) Patent No.: US 6,429,868 B1
(45) Date of Patent: Aug. 6, 2002

(54) METHOD AND COMPUTER PROGRAM FOR DISPLAYING QUANTITATIVE DATA

(76) Inventors: Charles V. Dehner, Jr., 11730 S. Clare Rd., Olathe, KS (US) 66061; Wayne Hewitt, 8009 Rosehill Rd., Lenexa, KS (US) 66215

( * ) Notice: Subject to any disclaimer, the term of this patent is extended or adjusted under 35 U.S.C. 154(b) by 19 days.

(21) Appl. No.: 09/616,124

(22) Filed: Jul. 13, 2000

(51) Int. Cl.[7] .............................................. G06T 11/20
(52) U.S. Cl. ..................................................... 345/440
(58) Field of Search ................................ 345/113, 133, 345/150, 418, 419, 427, 440; 395/500.23

(56) References Cited

U.S. PATENT DOCUMENTS

| | | |
|---|---|---|
| 3,961,306 A | 6/1976 | Anstey |
| 4,169,285 A | 9/1979 | Walker |
| 4,954,981 A | 9/1990 | Dehner, Jr. et al. |
| 5,121,469 A | 6/1992 | Richards et al. |
| 5,416,890 A | 5/1995 | Beretta |
| 5,462,438 A | 10/1995 | Becker et al. |
| 5,546,091 A | 8/1996 | Haugen et al. |
| 5,632,009 A | 5/1997 | Rao et al. |
| 5,854,851 A | 12/1998 | Bamberger et al. |
| 5,917,500 A * | 6/1999 | Johnson et al. ............. 345/440 |
| 5,966,672 A | 10/1999 | Knupp |
| 5,986,673 A | 11/1999 | Martz |
| 6,023,280 A | 2/2000 | Becker et al. |
| 6,023,637 A | 2/2000 | Liu et al. |

* cited by examiner

Primary Examiner—Almis R. Jankus
Assistant Examiner—T. F. Cunningham
(74) Attorney, Agent, or Firm—Hovey, Williams, Timmons & Collins

(57) ABSTRACT

A method and computer program for simultaneously displaying very large sets of quantitative data. The method and computer program permit the display of quantitative data without first standardizing the data. The method and computer program also permit an observer to display the data space under user controlled color mappings, to select color spectrums to emphasize or hide certain data or certain characteristics, and to move over and fly through the data space to identify and analyze areas of interest.

20 Claims, 7 Drawing Sheets

(1 of 7 Drawing Sheet(s) Filed in Color)

METHOD AND COMPUTER PROGRAM FOR DISPLAYING QUANTITATIVE DATA

BACKGROUND OF THE INVENTION

1. Field of the Invention

The present invention relates to the display and analysis of quantitative data. More particularly, the invention relates to a method and computer program for simultaneously displaying very large sets of quantitative data without first standardizing or conditioning the data, while still permitting viewers to easily distinguish individual variables and values in the display, and allowing wide control over a color mapping process.

2. Description of the Prior Art

The ever-increasing use of computers has expanded the amount of quantitative data available for analysis. For example, both professional and amateur stock traders now have access to tremendous amounts of data that can be used to track and analyze stocks, and health care providers can monitor a plurality of vital statistics within an intensive care environment. As computers become more ubiquitous, the amount of quantitative data available for analysis is expected to continue to grow at an extremely rapid rate.

Quantitative data is often most useful when it is displayed so that viewers can see or visualize trends or patterns in the data. For example, stock traders often desire to view time series of several stock prices and volumes and to compare the performance of the stocks, or compare entire sectors of stocks made up of hundreds of time series.

Many different types of graphs and data mapping techniques can be used to display quantitative data for analysis purposes including line graphs, bar graphs, area graphs, surface graphs, two, three and four-dimensional contour graphs, bubble graphs, column graphs, heatmaps, treemaps, etc. Many of these techniques can also be combined with color mapping procedures wherein data values within the graph or data map are indicated through means of a color display or color "values". Color can be used to indicate a value and also to enhance certain characteristics of the data, or to indicate priorities or alerts. Color mapping is used, for example, in line graphs, contour maps, heatmaps, treemaps, and in imaging applications including medical imaging, radar, and other sensor data display.

Unfortunately, these prior art graphs, data displaying, and color mapping techniques suffer from several limitations to their utility. One limitation is that prior art graphs are generally limited in the number of variables which they can display simultaneously while still allowing differentiation of individual variables and/or values within the graph. For example, a line graph with six or more time series or variables typically looks cluttered and the data therein becomes intertwined, making differentiation between individual time series variables difficult if not impossible. One solution is to stack multiple graphs to view simultaneously, but this solution is limited in the number of graphs that can be displayed and it can be difficult to make comparisons across the graphs.

Another limitation of prior art graphing and data displaying techniques is that for a number of series to be effectively graphed the data needs to be in a relatively narrow or common range. This problem occurs both in line graphs and in color contour mapping. On a line graph, when the data is not in a common range, it must be transformed, normalized, or standardized to a common scale, or a variable must be selected which is in a common range. If not in a common range some of the time series may be difficult to distinguish and appear no different from zero. For example, if ten stock prices, a market index, and a market volume are to be graphed together and the stock prices have values ranging between $4 and $250, the market index has values ranging between 5,000 and 10,000, and market volume has values between 500 million and 2 billion, on a common graph scale the time series with the lower values become indistinguishable from zero. One solution to this problem is to provide separate Y-axes, however, this solution is limited to graphs containing only a few variables. In many cases the observer desires to see as many variables simultaneously as possible. Another solution is to mathematically transform or normalize the data to a common range, for example, by taking the logarithm of the data, standardizing the data, mapping the raw data to a relative index based on a reference point or to some other variable with a common range, for example percentage change. This solution is limited because observers may have difficulty inverting the transformation to determine the actual value of the raw data which may be of interest, and also the need to choose variables with a common range severely limits the choice of data. In addition, data transforming, conditioning, or normalizing for graphing or other displays can be a laborious effort and often needs to be done on a case by case basis, the approach to use depending on the type and particulars of the data.

In a limitation related to time series being indistinguishable from zero on a line graph, treemaps are displayed with an "area-coded" variable which determines the size of a rectangle displayed on the screen, small area coded variables are difficult to distinguish or find on the treemap graph, the analog of being indistinguishable from zero on a line graph. Treemaps can be rotated to view from different angles but the process does not guarantee that small area-coded variables will be found, and the correct angle for viewing is uncertain.

A similar limitation related to scale exists in color mapping of data using contour color mapping approaches as found in two, three, and four dimensional contour maps, in heatmap and treemap applications, and in imaging. Contour color mapping uses the entire data space or data matrix (image) as the basis for the color process. Unless the data is in a common range, it may happen that only the most extreme colors in a color spectrum made up of a number of colors ordered from high to low, will be used. In the example of stock prices, market index, and market volume, mapped on the same contour graph or on a heatmap or treemap, the volume will use only the highest color and the small stock prices use only the lowest color. The color mapping process loses all its details. The prior art solutions to this problem are generally the same as used on line graphs. Mathematical transformations to a common range are used or the choice of variables is limited to those in a common range. These approaches suffer from the same limitations as the line graph solution, it is difficult for the observer to invert the transformed value to relate to the raw data value, and restricting the choice of variables to those in a common range severely restricts the utility of the approach.

Another limitation related to scale occurs with long and trending time series. Displayed on a line graph, when a narrow area (domain of time) of the graph of the trending series is viewed, with the scale or Y-axis set for the full data set, the area viewed appears flat. A similar problem happens in color mapping, when a small domain of the time series is viewed with the color process based on the full time series domain, the part viewed utilizes only a narrow band or few colors of the color spectrum, the analog to appearing flat on a line graph.

A related limitation is the effect of outlier data points on color mapping. An outlier is a value within a data set that is significantly different from the range of the rest of the data, e.g., beyond plus or minus 3 standard deviations. Outliers affect the color mapping by "absorbing" many colors. That is, the outlier will be assigned the highest (lowest) color in an ordered color spectrum, and there will be many colors unused between the outlier and the rest of the data, and then leaving relatively few colors to differentiate the range where most of the data is located. One solution is to provide methods to remove the outliers. Another solution is to index the outliers under a mathematical transformation. However these solutions are limited in their scope and capability.

Another limitation of prior art graphing and data displaying techniques is that they cannot effectively display data sets that are highly variable, or spiky, with many extremes. The many data points representing the extreme highs and lows can be difficult to visualize and can hide the remaining middle of the data space. For example, in three and four dimensional surface and contour graphs, many extreme highs and lows create a surface with a large number of peaks and valleys (spikes) at the extremes. The extremes themselves can be difficult to see and the middle of the data space can be hidden from view by the surface effects. One solution is to rotate the graph to view it from many angles, but finding the correct angle is uncertain and even when rotated many of the spikes are difficult to distinguish and the middle values are still difficult to view. The data can be normalized to a common range, however that suffers the same limitations as previously described.

Another limitation of color mapping processes as used in heatmap and treemap applications is that they graph only a single time point or observation for each time series. This approach makes it impossible to see local trends. One solution has been to show, for example, the change in a stock price from some specified point to another point in time. However, this solution is limited and fails to show the local detail. The observer often desires to see many time series as well as many time points and trends simultaneously and to see them for many differently scaled data sets.

Another limitation in prior art color mapping has been the limited controls available to affect the number to color mapping process. Prior art in graphs and data maps provides controls to change the color of a line or between one or another color spectrum. However, color mapping of data has several sub-processes at work, including the process of color spectrum construction, the definition of the data set or area of the data set used as the basis for color mapping, and the number to color mapping function. Each process can provide controls which when combined make a huge range of effects possible with great utility in the display of data.

Another limitation of prior art graphing and data displaying techniques is that the images created are generally limited and static. The data in the graph or map is selected, any sorting or arrangement is made, and the image then constructed. Data may be provided on an updating basis with varying alerts or values indicated but the variables on the graph or map are set and limited. An area of the graph may be selected to view, changes may be made to the axes (for example, show on a logarithmic scale), and choices may be made from predefined color spectrums where color is part of the display process, but other than these few choices, the image is fixed. The program user or data observer cannot "fly" over data to search for and visualize patterns and trends in virtually unlimited data spaces dynamically changing by characteristics of the data and by observer controls.

OBJECTS AND SUMMARY OF THE INVENTION

The present invention solves the above-described problems and provides a distinct advance in the art of quantitative display techniques. More particularly, the present invention provides a method and computer program for simultaneously displaying large and even unlimited data spaces of quantitative data without suffering from the limitations described above. This is achieved by combining methods to construct data grids of a virtual data space, with methods and controls for a number-to-color mapping process, with methods and controls for "movement", and with a range of mathematical operations.

The method and computer program of the present invention permit the simultaneous display of very large and even unlimited databases of time series or other ordered data sets so that a viewer can simultaneously visualize trends and patterns in the data. The computer program and method achieves the foregoing while still permitting viewers to easily distinguish individual variables and values in the data space and simultaneously displaying many variables as well as many data points over time.

The method and computer program also permit the simultaneous display of data sets with widely different ranges and a high degree of variability without first conditioning, transforming, normalizing, or standardizing the data sets. This permits observers to readily compare different data sets without the need for significant pre-conditioning of the data or selection of variables in a common and narrow range.

The method and computer program also permit an observer to interactively and dynamically reorder, sort, categorize, and transform a displayed data space or parts of it. The invention permits the observer to apply any of a variety of mathematical operations to create new data spaces or to modify the display of the current data space.

The method and computer program also permit an observer wide control over a number-to-color mapping process (associating a particular color with a particular numeric value). This is accomplished with controls to construct or select color spectrums, controls to change the spectrum display in ways to emphasize or hide certain data or certain categories of data as well as to reveal patterns in the data, controls to select subsets of the data space to color map independently, controls to set the particular number to color mapping function, and with controls to select a retrospective or an animated real-time color mapping mode.

The method and computer program also permit an observer to view a display of quantitative data within a "data space" and to fly over and through a data space built with perspectives and three dimensional effects. The result is to move the observer from the mind set of "viewing a graph", to one of "flying through a data space". Movement can be vertical (to see more or less data or surface area on the screen), or horizontal (through time and across variables), and the motion can be combined. Movement controls and flying beyond the edges of the screen allow virtually unlimited data spaces to be accessed and visualized.

These and other important aspects of the present invention are described more fully in the detailed description below.

BRIEF DESCRIPTION OF THE DRAWING FIGURES

The file of this patent contains at least one drawing executed in color. Copies of this patent with color drawing(s) will be provided by the Patent and Trademark Office upon request and payment of the necessary fee.

A preferred embodiment of the present invention is described in detail below with reference to the attached drawing figures, wherein.

DETAILED DESCRIPTION OF THE PREFERRED EMBODIMENTS

As used in the preferred embodiment description, "data variable" refers to a selected time series, for example a stock price over time; "data set" refers to a set of observations for that time series, for example daily stock price closes since the stock began trading or for the last five years; "data space" refers to a collection of many data sets, for example daily stock price closes over the last five years for all stocks listed on the New York Stock exchange; and "observer" is synonymous with computer program user.

Figure 1:
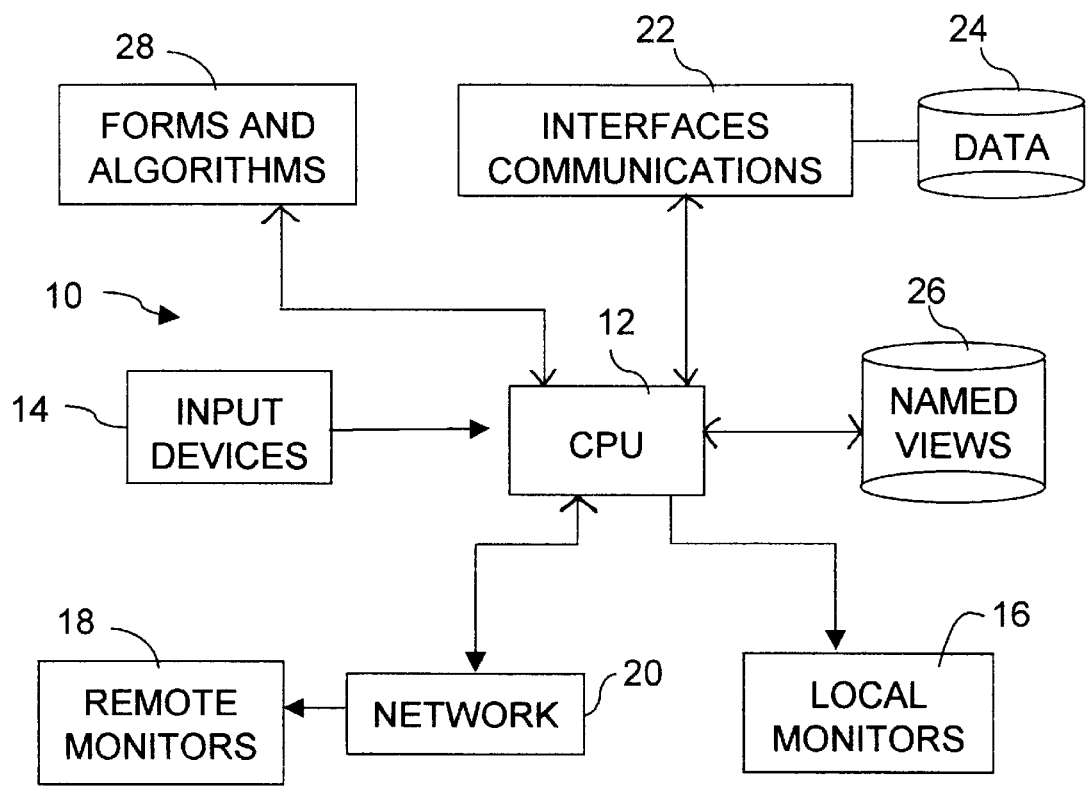
FIG. 1 is a block diagram depicting components of a computer system that may be used to implement certain aspects of the present invention.

Referring to the drawing figures, and particularly FIG. 1, the method and computer program of the present invention are preferably implemented with a computer system 10 as illustrated. The system 10 broadly includes a central processor or controller (CPU) 12; input devices 14 such as a keyboard, mouse, and joystick coupled with the CPU 12; one or more display monitors 16, 18 connected to the CPU 12, either directly or through a network 20; interfaces and connections 22 to data sources 24, which may be either internal to the system or externally accessed by intranets or the Internet; memory 26 for storing or saving certain information used in the invention; and memory 28 with linked algorithms used to direct the processes of the CPU 12 either automatically or in response to user inputs. The memory 28 may provide access to algorithms for grid forms, color mapping and control, movement, math functions and sorting, as well as expert system and probability based tools to help users in control of the processes.

The invention is described in terms of its use with time series data such as stock prices, economic indicators, or medical information, as well as other ordered data sets such as repeated samples. It should be understood, however, that the color mapping processes that are part of the invention may be used with image and sensor data, and the types described herein are provided only for purposes of disclosing a preferred embodiment of the invention and do not limit the scope of the claims.

The computer program of the present invention controls operation of the CPU 12 to perform many of the steps of the invention. The computer program may be written in any computer language as a matter of design choice and may be stored on any computer-readable memory device such as a hard drive coupled with the CPU.

The computer program utilizes standard menu approaches to permit an operator to access all of its functions. Certain features of the program are available in a pop-up menu available at the right click of the mouse over the data space or other input command. The right click menu may, for example, include features to add a selected variable to a line graph, to remove certain values or variables from the data space, to zoom on a selected area of data, to zoom and recolor on an area of data, to provide statistics on selected variables and areas of data, to access notes attached to a time point, and the Drop to Ground/Fly-Over functions described below.

The computer program may also display a dashboard as an alternate access to controls and system settings, as will be described.

Figure 2:
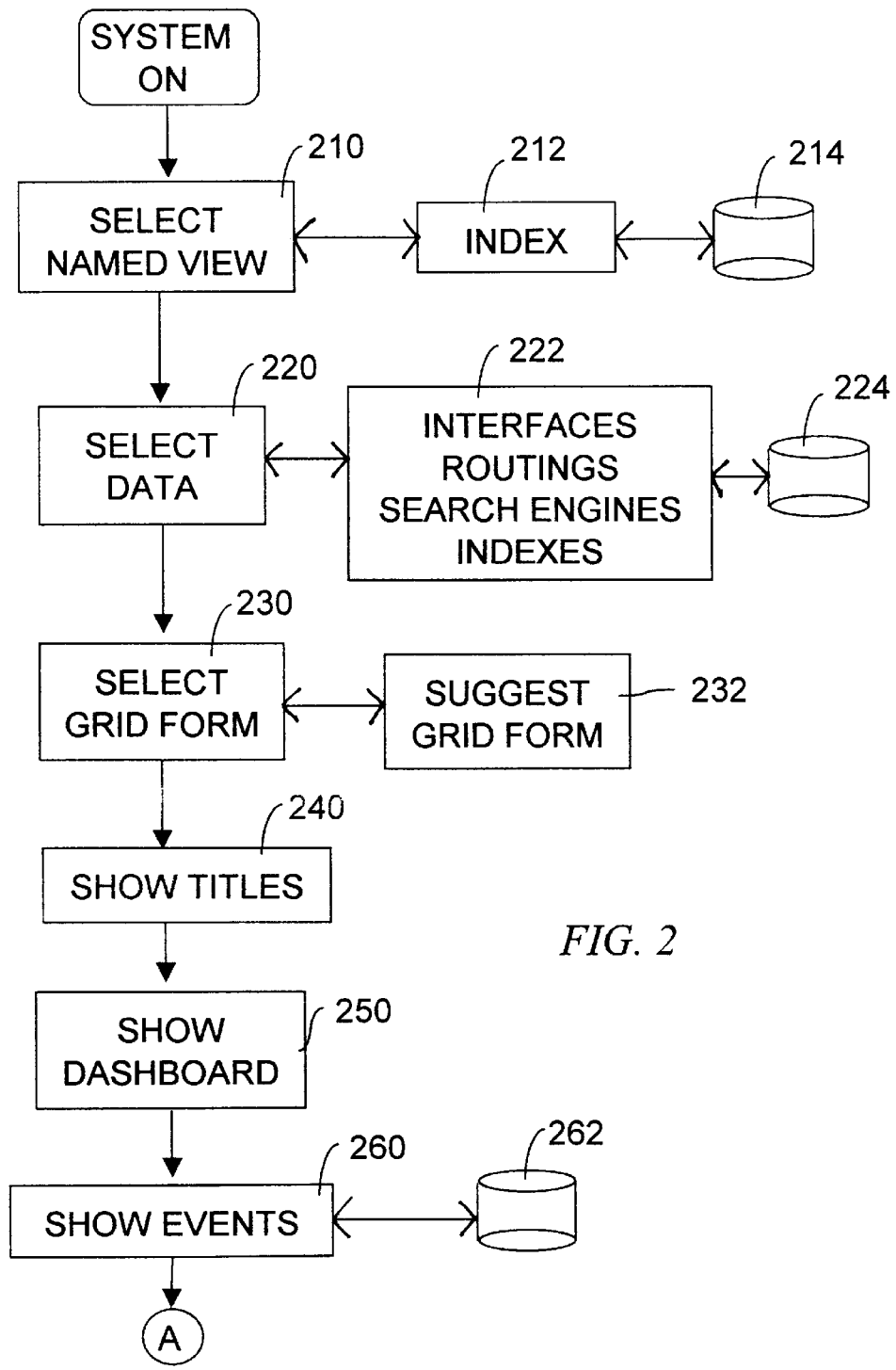
FIG. 2 is a flow diagram illustrating certain steps in the method and computer program of the present invention.
Figure 3:
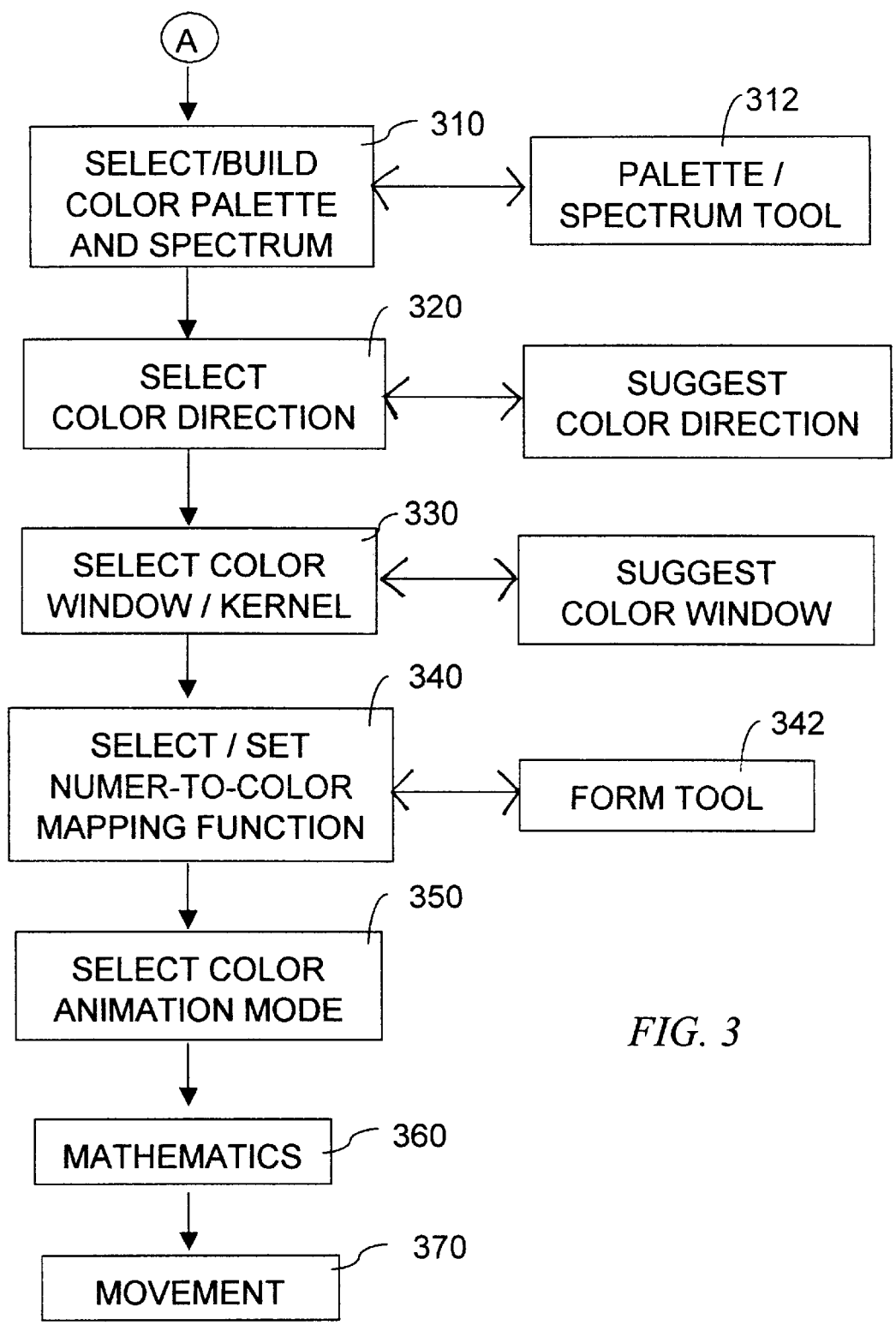
FIG. 3 is a continuation of FIG. 2.

FIG. 2 and FIG. 3 illustrate flow charts setting forth certain preferred steps performed by the computer program to implement certain steps of the present invention.

Though listed in a sequence, the selections which activate the functions can be selected at any time and be changed interactively.

The method of the present invention broadly includes the steps of selecting or constructing a virtual data space and setting control options as shown in steps 210 through 260 of FIG. 2, selecting or constructing a data to color mapping process as shown in steps 310 through 350 of FIG. 3, and selecting mathematical transformations and movement controls as shown in steps 360 and 370 of FIG. 3.

Selecting or Constructing a Data Space

Before data can be displayed and color mapped, a virtual data space must be created for the data display. A data space may be created by either selecting a previously stored Named View, in step 210 of FIG. 2, or by constructing a new data space. A Named View is a data space setting constructed by any observer including field experts, and then saved. Named Views are complete display settings, including data, grid, titles, menu form, color mapping, transformations, and movement position, as will be described. They are generally built for a special purpose or certain type of data. In the present invention Named Views can be selected from a library of constructed Views. Named Views are provided with an option to update and refresh data or to hook into a data stream. Notes can be attached, and Named Views can be sent to others or added to a stored library and Named Views can be sequenced in a presentation module.

In step 210 of FIG. 2, the computer program first asks whether the data space will be constructed with a Named View. If the answer is yes, the computer program provides an index 212 of Named Views stored on a local storage media or available over a network or Internet connection 214. The program then proceeds to step 310 in FIG. 3 to provide control of the color spectrum and other color mapping processes as described below.

If the user elects to construct a new data space rather than selecting a Named View, the computer program proceeds to step 220 of FIG. 2. A new data space is constructed by selecting data in step 220, selecting a grid form in step 230, and then populating the grid form with the data, each cell of the grid assigned a data value. A constructed data space can be rearranged by category, ordering, sorting, removing or adding variables or values, and other techniques as described in more detail below.

Select Data Sets

The first step in constructing a new data space is to select the data to be mapped as depicted in step 220 of FIG. 2. In terms of time series, data can be selected a single variable at time or in groups of data by search criteria or other categories. Data can come from many different sources including a catalog of time series, databases, data files, intranets, or the Internet. Depending on the amount of data and system configuration, an entire data space of interest can be loaded to CPU memory or data can be linked to the system and called on demand. A data source can supply real-time or monitoring data and new or sampled data points can be added to the display as they become available. Data can be accessed using indexes, search engines, and other tools. Interfaces, connections, and routings 222 can be added to the system as needed to access local media and network or Internet based information sources, 224.

Time series are stored in an approach which limits the amount of memory required for computer processing. A time series is represented by its type, title, starting date, number of observations, and data values, not requiring a date to be attached to each value. Type is related to a certain calendar configuration, for example type "stock market daily" is associated with a calendar of trading days. Type can be predefined or can be described with the first variable added to a data space and can be redefined for new data types.

Certain "events" can be associated with a particular time point in a time series, for example, the occurrence of a stock split. Events are stored with a pointer to the location of information describing the event, the location can be local media or over a network or through the Internet.

Select Data Grids, Perspective, and Three Dimensional Effects

The second step in constructing the virtual data space is to select a grid form as illustrated in step 230 of FIG. 2. Based on the data selected, the expert system process support of the computer program may suggest certain grid forms in step 232. One type of a grid form is a basic grid. In a basic grid, there are N+ data sets (time series), each with up to T+ observations (time points). These can be thought of arranged in an N+ by T+ matrix and the data matrix mapped to the data grid, one value per cell in the grid, representing a virtual data space. The N+ and T+ symbols are used to indicate that the matrix or data space may be a static space with N rows and T columns or may be dynamic with changing values, rows, and columns, including the process of updates to a database, the removal or insertion of variables or of values from the data or the color mapping process, and other changes based on dynamic characteristics of the data or by observer selections, as will be described. This virtual data space shows many time series and many time points simultaneously. When combined with the controls for movement as described below, the data space can be effectively unlimited.

Figure 4:
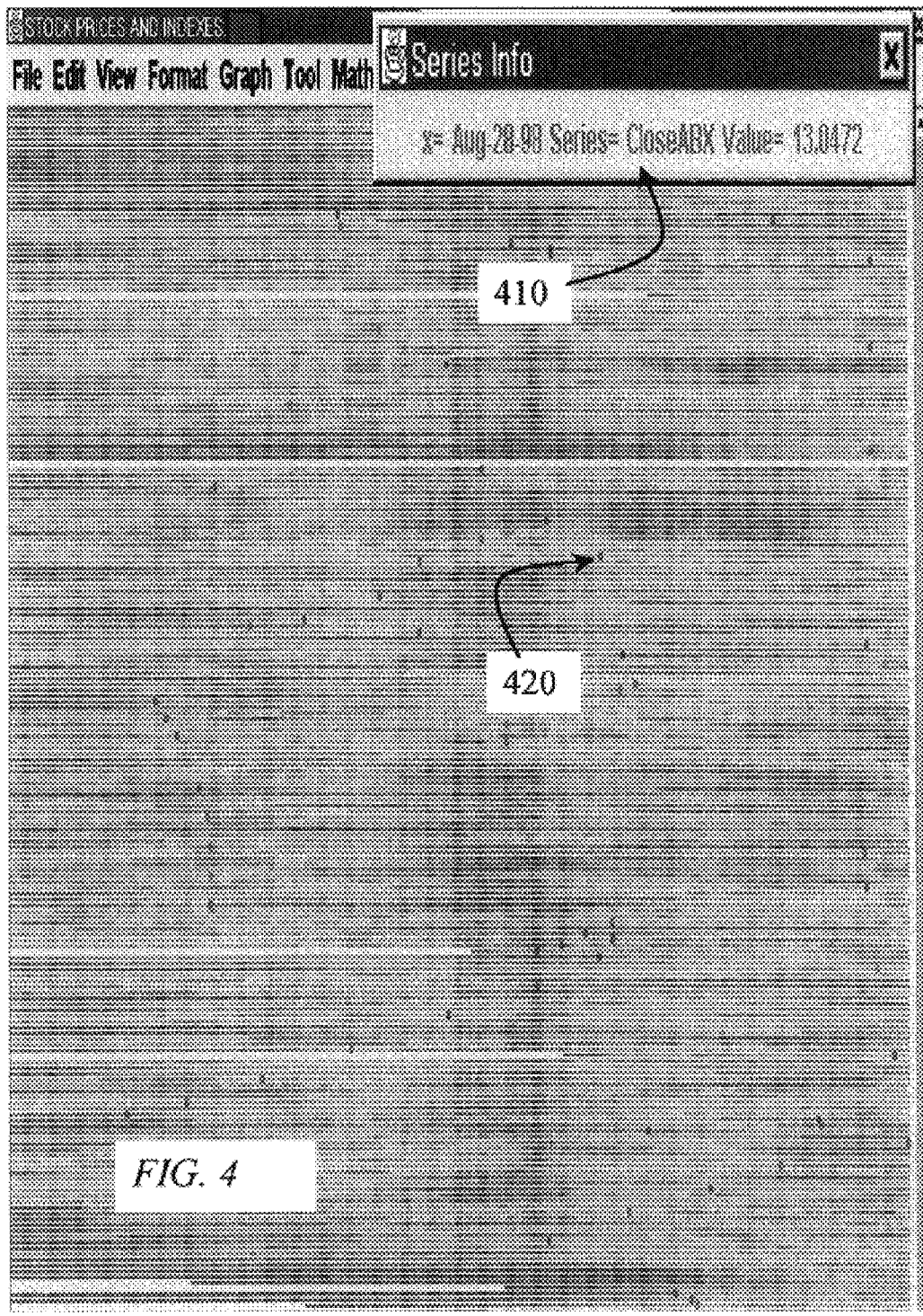
FIG. 4 is a screen shot of a data space color-mapped in accordance with one example of the present invention, the Basic Grid, with certain control functions shown.

FIG. 4 illustrates an exemplary "basic grid" with its color mapping. Reference numeral 410 indicates the titles bar as will be described and reference numeral 420 indicates an event outline as will be described. Each row is an individual time series and each cell in the grid represents a single observation or time point. Time is across the grid from left to right. In the default mode of the present invention each row is color mapped independently, though using the same spectrum and number-to-color function as will be described in more detail. Cells can also serve as an entrance point into separate data spaces in a drill down approach where selection of a cell then displays the new data space or a report in graphic, text, or other format. Drill down locations can be indicated by the cell border technique used to indicate events as will be described. A row of the grid can also be selected and more detailed data shown in a "roll down" process, or areas of data can be hidden in a "roll up". For example, a stock category index, for example a biotechnology stock price index, may be indicated, together with other indexes by sector or industry group. With the pointer over an index the right click menu provides an option to roll out detailed data. It can show, for example, all the stocks that make up the index or in the industry group. Those time series are added to the image as rows under the index. Data can be rolled up in a reverse manner. The program configuration allows a single frame image as shown in FIG. 4 or multiple frames or data spaces to be displayed simultaneously on a single monitor or across multiple monitors. When multiple frames or grids are used, they can be set to "synchronize" movement and cell sizing as will be described.

A grid can also be given perspective including effects of height and distance away from the observer position (time on the axis moving away from the observer), as well as effects of convex ground, a semi sphere, or sphere. Perspective is built using common algorithms for transformation of a two dimensional space to a three dimensional perspective, as found in the computer graphics literature. Perspective effects allow more data to be placed on the visible screen area (distant observations use less area), and importantly, allow and support the sense of movement through a data space. A data space can extend beyond the viewable area of the screen, supported by the movement over the data plane or through the space.

Figure 5:
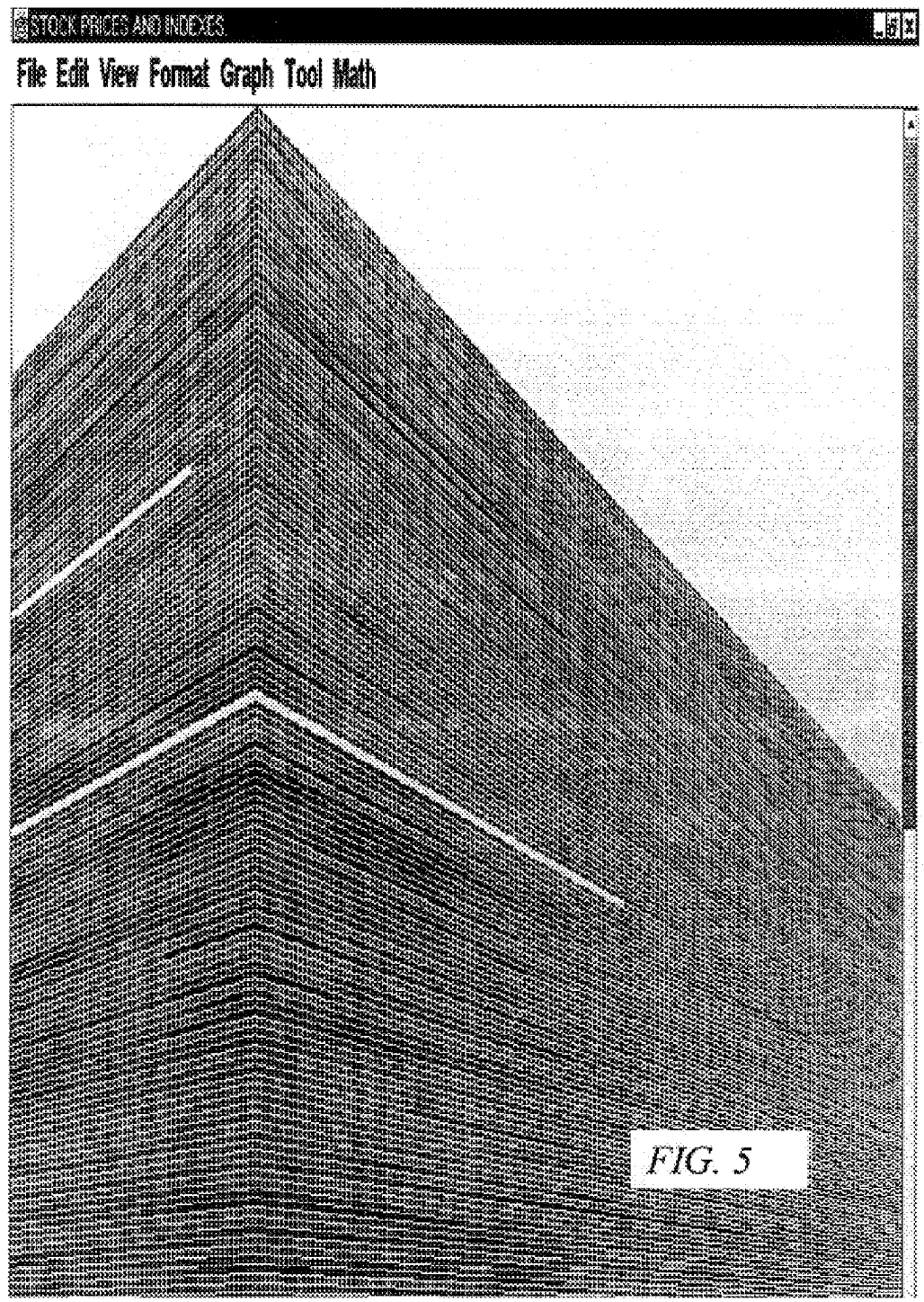
FIG. 5 is a screen shot of a data space grid with one example of a three dimensional perspective effect as used in the present invention.

Grids with perspective can also be arranged to provide a focus area. In terms of time series, a focus is a point in time with perspective away from the observer position both forward and backward in time from the point of focus. Focus can also be at the most current time point. The result generates a larger cell size at the focus point and gives it greater visual weight, it also supports the sense of distance in a virtual data space. FIG. 5 illustrates a grid with one type of perspective and focus. The grid moves away from the observer forward in time toward the right on the figure as well as away from the observer backward in time toward the left. The observer can move closer to the grid and examine an area in detail or can fly over the grid surface and through the data space. Two forms of perspective motion are supported, according to whether the focus point is moved or not. In one case, a focus point and perspective is held fixed and the observer can fly over the fixed perspective grid. In the second method, the focus point and perspective move with the observer position as they fly through time or otherwise move over the data space. This approach keeps the focus under the observer position and the focus can be scanned through the data space.

Grid cells can also be given height to represent another variable. The analog is to look down at a set of buildings in the basic grid, or to look at them from the side and see a height to the cell, the height indicates another variable at that time point, for example, stock volume. Though possible in the invention, this also hides some values from view and in that sense limits one of the main advantages of the grid and presentation in the present invention, the ability to see all data points distinctly.

Multiple grids and monitors can be used to display larger or multiple data spaces. Multiple grids can be arranged with perspective to give the sense of three dimensional depth in the space and can be arranged on a single monitor or across multiple monitors. Each plane in a multi-grid space can have a section of a large data space or they may have transformations of a common raw variables data space. Multiple planes (or areas of a data space) can be mapped to colors under the same or different spectrums, number-to-color functions, and other color process controls as will be described.

The data grid or map can also be shaped into a grid on a cylinder or tube with the grid displayed on the boundary (interior and exterior wall) of the shape. The cylinder or tube can be given perspective and contour including a view to support movement through and around the data space. As with data planes or convex ground, these can be configured on a single monitor or configured to cross over or connect across multiple monitors.

Data may also be displayed within the volume area of the cylinder or tube or three dimensional space. Common volume rendering techniques are used to shape the grid and fill the volume area. The grid is then color mapped with the color processes provided in the present invention as will be described.

An object of this invention is to have the maximum possible area of a monitor dedicated to display of a data space and a minimal amount to controls and dashboard displays. As such, in the default the data space area is over 90% of the screen area. In order to maximize the coverage of the available area, certain approaches are used to set the grid cell size and to utilize the area available for data display.

Grid and cell sizing methods are used to fill the display area and to provide for perspective and zoom (or altitude) settings. These algorithms are based on the amount of data in the data space, the resolution of the computer monitor, and the particular view and grid selected including the level of zoom (altitude) and perspective. Grid sizing operates to maximize the screen usage with the ability to retain the aspect ratio or perspective of the grid shape. Cells are built of a number of pixels to make up a border and interior. To determine the cell size for the display, the algorithm first divides the total number of data points in each direction by the number of pixels available on a given monitor in that direction (the program senses the resolution of the monitor determined by the hardware and software settings). Let N be the number of time series (rows in the data space vertical direction) and T be the number of observations on each (columns in the data space horizontal direction). Let P be the resolution (number of pixels) in the vertical direction (for example 1024 less 20 for menus and controls space) and Q be the resolution in the horizontal direction (for example, 1280 less 50 for menus and controls space). Let N/P=V be the possible (vertical) height of the cell and let T/Q=H be the possible width. When presented with borders (the borders can be turned off in the invention) a cell requires a minimum of 3 by 3 pixels. A one pixel border on each of the four sides and a minimum of one pixel in the interior. Depending on the type of data in use and the invention default configuration settings, the program determines the size of a square cell using either the vertical (V) or horizontal (H) calculation. In the preferred embodiment of time series data, the horizontal direction cell size H (time) is used and a square cell of that dimension is generated, assuming it is greater than three. If the H value is less than three then a default of 3 is used and scroll bars and movement controls are provided. If the square cell size is three or greater then the algorithm next checks to see how much of the viewable data area will be used by the given data space at the maximum zoom or altitude setting. If the amount of data selected for the data space, at the maximum zoom or altitude setting, uses less than 80% (or a level set in the program default configuration settings) of the screen area then the square cell size is increased a single pixel vertically and horizontally.

In grids, tubes, or cylinders with perspective, a non-square cell sizing algorithm is used to generate the perspective. In addition, depending on the perspective selected and zoom setting, values at the far distance in the perspective may have their border removed in order to require less space.

In the program default, square cells are implemented. This can be changed by configuration settings and a non-square cell sizing option can be selected which sizes the cells to fill the data display area using both vertical and horizontal settings separately under the 80% rule described. Cells can also be set by the observer to a fixed size (subject to perspective) as is used in the animate color process mode as will be described.

Once a grid form has been selected, the next step in constructing a data space is to populate the grid with the selected data. Each cell is assigned a certain value of data and that value mapped to a certain "fill" color as will be described. Cells can also indicate a data characteristic using a brightness color control as will be described. A populated grid can be shown with different titles, dashboard display, and events setting as depicted in steps 240, 250, and 260 of FIG. 2.

In step 240 of FIG. 2, the user can select different title display options. The computer program displays titles as a user moves a cursor or pointer over the populated grid. The titles are displayed without the need to click the mouse, wait for a title to pop-up, or otherwise indicate. Information for the exact location of the cursor point is shown immediately in the titles display. Titles can be displayed in a short or long form, and in a titles bar or in a barrel display. The display and which fields of information are included can be program defaults or can be customized by the observer using configuration settings. The short form display is in a rectangular box or bar, and typically has the title, category, date and time, and value for the point at the cursor. FIG. 4, reference numeral 410 indicates a short form titles bar displayed at the top of the screen. The titles bar can be moved to different locations and it can also float within the image, located opposite the direction of indicated motion of the cursor. The long form display typically includes title, category, date and time, value, maximum, minimum, and average for the data variable over a selected window or data domain, and the location in standard deviations of the particular value with reference to the domain selected. The titles barrel is the same as the title bar except it shows the five titles centered on the location of the cursor, that is, it shows the title at the cursor, the two above and the two below. The number of titles to show in the barrel display can be specified through a menu option within the computer program of the present invention.

Two forms of titles display and pointer movement are supported: a "fly-over" and a "walk-about". The default mode of titles display and cursor movement is called a fly-over. A fly-over is the rapid movement of the pointer over the screen using a computer controller device, such as a mouse or joystick. Whatever is under the cursor pointer is displayed in the titles. Because of the quickness of the movement and possible density of the data points on the screen, it can be difficult to move a single point or cell at a step on the ground using the mouse or joystick, for example, if the observer desires to browse an area, see a particular value, and walk across a number of time series (rows in the data space) noting the title on each as it is traveled over. The invention provides an option for such cases by allowing the user to drop to the ground and "walk-about". Walk-about motion is step by step (cell by cell). It is activated by a menu selection. When walk-about is selected, an outline border, as will be described, is activated around a cell indicating the location on the ground grid. Inputs from a mouse, joystick, wheel, keyboard arrows, or other input device will then move the outlined cell (cursor) a single step at a time in the direction selected.

In step 250 of FIG. 2 the user can select dashboard settings. The dashboard is an optional display of information and settings, as well as access to controls. The dashboard may also display icons that can be used to quickly change settings. The dashboard can be turned on or off, and can be configured with different displays, options, and icons. Standard elements on the dashboard are the start and end dates of the data displayed, and a control to select new start and end dates and to recolor as will be described. Also on the dashboard are drop down menus to select and control color spectrums, altitude (zoom), color window settings, titles display, color direction, sorting, grid type, and icons for different color spectrums or a step through of a spectrum space, all as will be described in more detail.

In step 260 of FIG. 2 controls and display methods are provided to indicate and access an "event" information associated with a certain data point or cell in the grid. Events can be associated with any time point in a data space, they are additional information tied to that time point, for example a stock split, a news story, or a text note attached by a program user. Events are indicated by a different outline color or border around the time point or cell. FIG. 4 reference numeral 420 indicates a cell with an event border. When the event cell is indicated with the cursor, either by a fly-over or walk-about, a menu option can access the event information. The information can be text or graphics and can come from program memory, local storage media, or over a network or the Internet as indicated in step 262 of FIG. 2. Many different sources can be configured into the event data. The border color is determined to provide differentiation regardless of the fill color for the particular cell, but without shading or changing the fill color and with the capability to adjust dynamically to changes in the color spectrum. This is accomplished by determining a border color individually for each cell, based on the RGB settings (or other color space description) which define that cell's fill color. If the red R in the fill color is less than a breakpoint (127 is the default) then the red for the border is set to 255, otherwise it is set to 0. A similar rule is followed for the green and blue settings to determine the RGB specification of the border color. The breakpoint values can be changed in the default configuration settings.

Mapping Data to Color

Once a virtual data space has been constructed, the computer program begins the steps of color mapping the data as depicted in FIG. 3 steps 310 through 350.

Color mapping is the process of creating a color spectrum, mapping the numbers in the grids of the data space to the colors in that spectrum, and then filling the grid location cell with the appropriate color. This portion of the computer program includes methods and controls that permit an observer 1) to select or build a color palette and spectrum using a Palette/Spectrum builder Tool in steps 310 and 312 of FIG. 3, 2) to select a color "direction", dimension, or grouping in the data space (row, column, matrix space, or other category) in step 320, 3) to select a color window and / or kernel setting in step 330, 4) to select and set a number-to-color mapping function using a general purpose Form Tool in steps 340 and 342, and 5) to select a color mapping mode, either retrospective or real-time animation, in step 350.

These color mapping controls allow a wide degree of effects useful for data mapping, including for example enhancing or suppressing certain areas of the data space, hiding certain areas from display or from the color mapping calculations, using different spectrums to show different data characteristics or to show different categories of data in a data space, among others.

Color mapping is based on the range of values and statistical characteristics of a data set, for example, of a particular time series. Depending on the color process settings of the present invention (spectrum, direction, window, and mode, as will be described), the maximum and minimum and statistical characteristics of a data set determine the color mapping (the fill color of a cell representing the value in that cell). Changing a data set by new values, by selecting a subset of the data set, or other choices which change the maximum and minimum, then generally change the color mapping, that is, the fill colors associated with particular numeric values.

Select or Build a Color Spectrum

The first step in the color mapping process is to create or select a color spectrum for the data space as depicted in step 310 of FIG. 3. The color spectrum generally includes a spectrum of gray scale. A spectrum is a number of colors ordered from a low to high. In a general number-to-color mapping process, relatively small numbers in a data set are mapped to low colors in the spectrum and large numbers to high colors. A number of default spectrums are defined within the invention or the user can specify or create their own.

A spectrum contains a certain number of colors. The number can be selected within the invention at the time of building a spectrum and/or interactively specified to affect the number-to-color mapping function as will be described. Typical spectrums are made of 7, 15, and 21 colors. In the invention, the number of colors can be set by an observer and can range from a few to a nearly continuous range of many colors and the number of colors in certain areas of the spectrum can be varied. The process of color mapping is then one of discretization, that is, mapping a continuous number range to a discrete number of colors where the degree of discretization can be high with a few colors or low when many colors are used. To build a spectrum with a low number of colors, each color could be individually selected, however, this fails to benefit from the art of color mixing using the few colors of a palette to generate many colors in a spectrum which have a conceptual, color space relationship. In the invention, a spectrum is constructed or edited by use of a Palette/Spectrum builder tool as depicted in step 312 of FIG. 3 and shown in use in FIG. 6. The spectrum is built from specification of a palette of a few "anchor" colors each anchor color located at a certain point in the spectrum. The remaining colors of the spectrum are filled with a combination of the specified anchor colors. In the invention default, combinations are made by making equal sized steps, in the sense of RGB setting, from one anchor color to another. For example, in a 15 color palette with the end colors (color 1 and 15) and the middle color (color 8) specified as anchor colors of the palette, colors 2 through 7 are combinations of colors 1 and 8 and colors 9 through 14 combinations of colors 8 and 15. In the default, an equal number of colors are spaced between the anchors. In the invention, as will be described, more colors can be added in a certain area of the spectrum to provide greater differentiation of values in that data range. Prior art techniques typically place a color at each end of the spectrum and then distribute colors evenly (a linear combination of the two) in the places between. This fails however to give much control over or within the spectrum space. Control of the spectrum, and use of the spectrum as a parameter space, are important parts of the present invention to control color mapping and to reveal patterns which are easiest to find when visualized.

Figure 6:
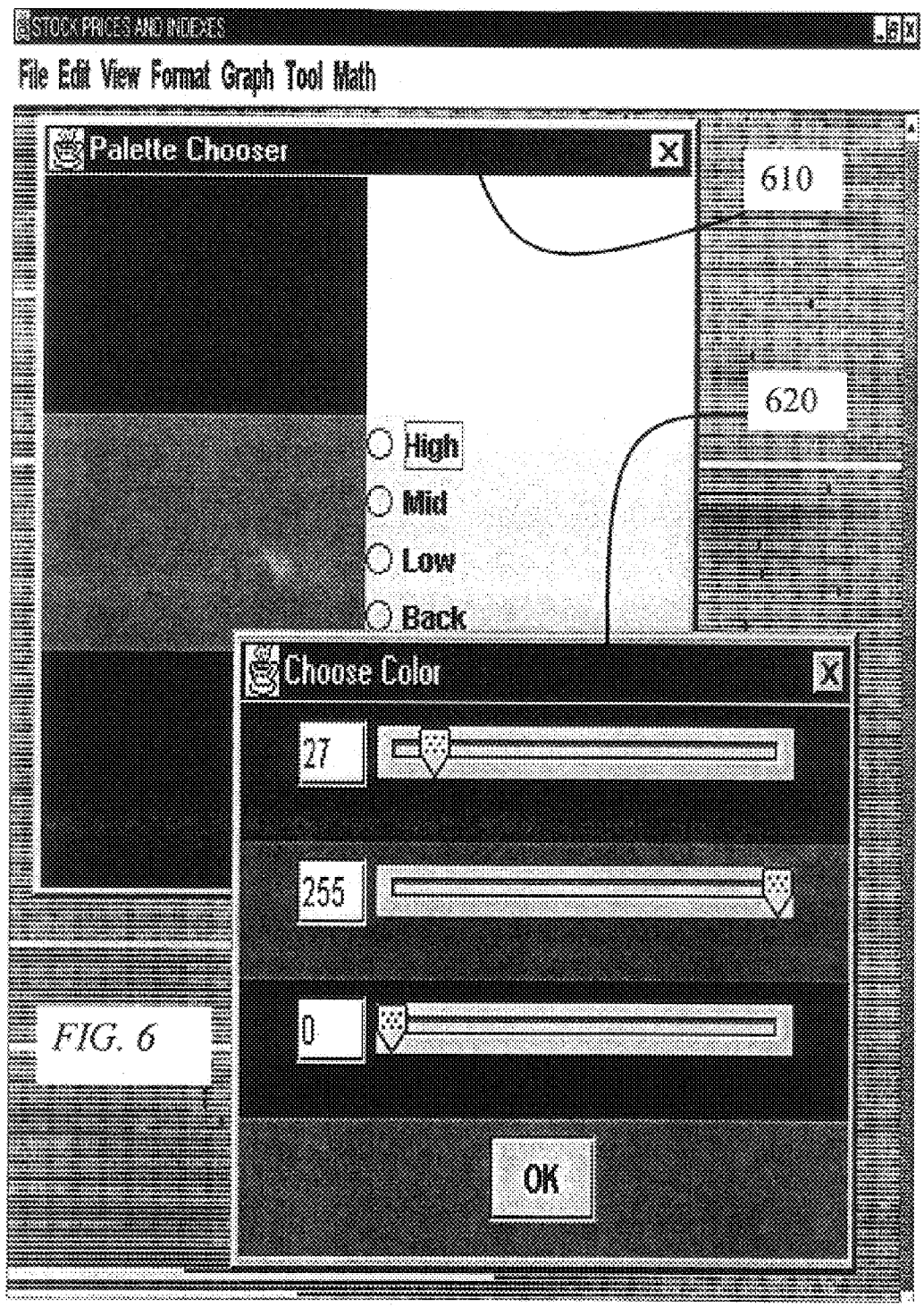
FIG. 6 is a screen display of the Palette/Spectrum tool used in the computer program of the present invention.

The default in the invention is to specify four palette colors: three anchor colors: low, middle, high, and a background color, as shown in FIG. 6. The spectrum between the specified anchor colors is filled with linear (in the default) or nonlinear combinations of the RGB settings of the anchor colors. Colors can also be specified with CYNK or other color space descriptions where a color space can be built of all possible colors given the hardware and software settings. HSV color attributes are also used within the invention to affect the brightness of a fill color with useful effects. For example, in intraday stock trading (or any data where observations are not taken on each variable at each time point) the screen can be set to show a tic by tic or certain rate of observations, for example, every minute. Not all stocks in a space may have traded in that tic or time period. In order to keep the vertical time domain horizon even at its leading edge, the color in the non-traded stock is still filled, using the last traded price. However the desire is to show that the price is a continuation of the last traded price and not a new data point. This is accomplished by decreasing the brightness of the fill for those points that are continuations and not new observations.

In the invention, the number of colors in the palette can be specified, and these anchor colors can be placed in any location in the spectrum. Multiple anchor colors allow more control over the data display. In a setting used for process control and feedback of information, 5 colors are used: a background color, and four anchor colors: a color for good, a color for a neutral position, a color for attention, and a color for alert. In another implementation, a background and five anchor colors are used to set colors at plus and minus one and two standard deviations and at the mean of a data set. Multiple areas in the spectrum, the areas between anchor colors, allow for different effects in different areas of the data range. Using the methods in the Form Tool, as will be described, numbers and alerts can be set to certain colors in a spectrum and the spectrum can be used to highlight or suppress certain data or areas of data in the data space.

Colors are specified in the Palette/Spectrum tool in step 312 of FIG. 3 using RGB settings or other color space description methods. FIG. 6 shows the Palette/Spectrum tool being used to specify colors in a four color palette (High, Mid, Low, and Background) indicated with reference numeral 610. The RGB numbers can be entered directly or with use of a slider bar as indicated with reference numeral 620. The color result is shown in the builder tool. A red, green, and blue color setting is specified for each anchor color and the background color. The final spectrum setting is displayed in the Palette/Spectrum builder, on the edge of the Form Tool, and can be displayed in the titles bar, dashboard, and on the side of the grid display.

Specifying the background color becomes a valuable tool when, in operation, certain values, or ranges of values or variables are to be left out of the display but included in the color mapping process. For example, one option is to show only the values outside of plus or minus three standard deviations ("Show outliers"). This is implemented in the invention by filling only those cells (the outliers) with value color and filling the other cells with the background color.

A number of predefined spectrums are provided in the invention, these can be used directly and or edited and resaved. Different spectrums have different effects and can enhance or suppress certain areas of the data or affect the number-to-color mapping, the analog to optical filters. The observer can also construct their own spectrum with the Palette/Spectrum builder tool. Being able to edit spectrums or build their own, insures that observers use color spectrums which they can personally differentiate. Typical prior art provides two spectrums, one for normal vision observers and one for observers who may be color blind. In the invention, constructed spectrums can be saved and used later and multiple spectrums can be quickly switched between to explore different characteristics in a data space.

Different spectrums can be used on different areas of a data space. A different spectrum can be applied to each variable in the data space, to different groups of data sets in the data space, or the same spectrum can be applied to all data sets in a data space.

In a powerful feature of the present invention, a data space can also be viewed interactively while varying the palette/spectrum settings in a discrete or continuous manner. In effect this provides movement through the spectrum parameter space, in addition to movement through time. Spectrum parameters can be changed by varying systematically the palette colors through all possible combinations (continuously or in discrete steps). As a space is observed, changing palettes and related spectrums tends to show or highlight certain characteristics and features in the data, and reveals patterns that may be seen only under certain spectrum settings.

Select or Specify a Color Direction in the Data Space

In response to the difficulty of conditioning or normalizing data for a graph or contour color mapping and the need to have the data in a common, fairly narrow range, the present invention provides controls to select subsets of the data space, and to color these independently. This eliminates the need to have the subsets or data sets in a common scale, it does not require the user select a variable or variables with a common range, or to transform or condition the data space for graphing. To implement this, in step 320 of FIG. 3, the present invention provides options to select a "direction to color by" within the data space.

In terms of the grid space, the invention provides options to color the data by row, by column, by a subset of the data space defined by observer selection or characteristics of the data, or in typical prior art contour-coloring fashion based on the entire data space. If the data space is time series, the color-by-row option of the present invention colors each time series independently. Coloring each row or time series independently provides a powerful standardizing effect which makes data transformaton or scale conversion unnecessary. It makes possible the display of widely divergently scaled data without the need to condition or transform the data for effective graphing or color mapping. FIG. 4, for example, contains some stock prices in the range of $2 to $40, others in the range of thousands of dollars, as well as stock indexes ranging in the tens of thousands. The data is mapped without any change to the raw variables. To implement the color-by-row or other dimension or category, that row or category is considered independently as its own data set for color mapping purposes as will be described.

Select or Specify a Color Window within a Data Set

In the invention, the default color process is to use an entire data set being color mapped, for example all observations in a time series or row, as the basis for the color mapping process applied to that row. A problem mentioned with long and trending time series is the effect on the color mapping. Unless the range scale is reset, when a narrowed range of the display is viewed, for example an area of recent observations, the color appears flat, that is, only a small part of a color spectrum is used for the data on the screen. In response to that problem, and to provided added utility to the color mapping processes, the present invention allows the color mapping to be based on a selected subset within the data set (a data domain or window), or on an area of the data space, as indicated in step 330 of FIG. 3.

The window on which color mapping is based may or may not be all of the data in a data set or may or may not be more than the data displayed on the screen. Any domain of a time series data set can be selected to be the basis for the color mapping for that area or a smaller or wider area as will be described. For example, if all the data in a time series data set is used to color map that series, then each cell fill color is based on the value in that cell and the color mapping based on the range and characteristics of the full time series data set. For example, suppose the data space is made up of 1,000 time series, each with 1,000 observations. In the color by row option and full window, each time series (given the color spectrum) is color mapped based on all the values in its row or domain (all 1,000). Color mapping can also be based on a smaller set of data. In the invention, a subset of the domain can be selected, for example, the area currently viewed on the screen, and the color mapping recalculated based on just that area. In effect this resets the scale based on the area in view or the window selected. An area or window to use for the color mapping can be indicated with menu or pointer options. Options are also available to remove certain areas of data from the color mapping process.

For example, to color the display based on the data sets and area currently on the screen, the fill colors are recalculated based on the statistical characteristics of those subsets of the data sets, in effect resetting the color analog to the Y-axis. This option to recolor based on the data on the screen is also implemented in a dynamic recolor process, recalculating the color mapping as the data space is changed with movement controls or with the addition of data. One form of dynamic recoloring is the method used in the animate color mapping process (as will be described) of recursively (one point at a time) adding data points to the display and recoloring with each addition. Color windows can be implemented with or without kernel or weighting functions (for example, giving greater weight to points close in time and less to those further back in history). The color window can also be configured based on a period of time, for example, to color stock price data based on the last month, the last quarter, or the last year, or other time period as set by the observer.

Options are also available in the invention to define windows of a fixed width (fixed window, fixed break point) or in a moving window (using a subset of the data set made up of a window of data centered at or ending with a particular data point) implemented with or without use of a weighting or kernel function. For example, in the fixed break point option, a window of size 100 (window size can be specified within the program) is implemented as taking the first 100 data points from a specified beginning point and color mapping that area (under the spectrum and number-to-color function as will be described) based on those 100 points. The next 100 points (101 through 200) is then color mapped as a separate set, and so on through the data set. No effort is made to smooth the break point and it can be abrupt.

A fixed break point causes a problem if the area of interest is at a break point. As was described, any point can be examined in a window focused on that area by simply selecting a domain or area of the data space around that point as the recolor set. This is used, for example, when an area of the data space is selected with the mouse or menu controls, including zoom, and the recolor option is then selected.

A moving color window is a method which smoothes the transition and avoids abrupt break points. Moving windows can be selected in a centered or terminal (ending) point calculation. For example, In a 100 span terminal point window, beginning at the $100^{th}$ data point (the first 99 can be skipped as done in the default in the invention or can be estimated with the use of missing value algorithms) is the fill color mapping for that point based on the 100 data points up to and including that point. The window is then moved forward one point. At point (cell) 101 is the color fill based on the color mapping using the 100 data points 2 through 101. The process continues through the data set. Moving color calculations can also be implemented with a weighting applied to the data set (fuzzy coloring), for example, with more weight given to cells nearer to the calculation cell. These weightings can be implemented with standard weighting or kernel functions found in the statistics and computer graphics literature.

Select or Specify a Number to Color Function

The final step in color mapping is to specify a number-to-color function as depicted in step 340 of FIG. 3. This is the functional form which assigns numbers in the data range to colors in the spectrum.

Over a fixed range and to a predefined spectrum, look up tables and pre specified functions can be used in number-to-color mapping. However, the data ranges used in the invention may include any numbers of any scale, and predefined functions are difficult to specify. Also, because color spectrums may be changed regularly in the present invention, a lookup table for number to color relationships is impossible to use.

The Form Tool to Set and Control the Number-to-Color Function

Figure 7:
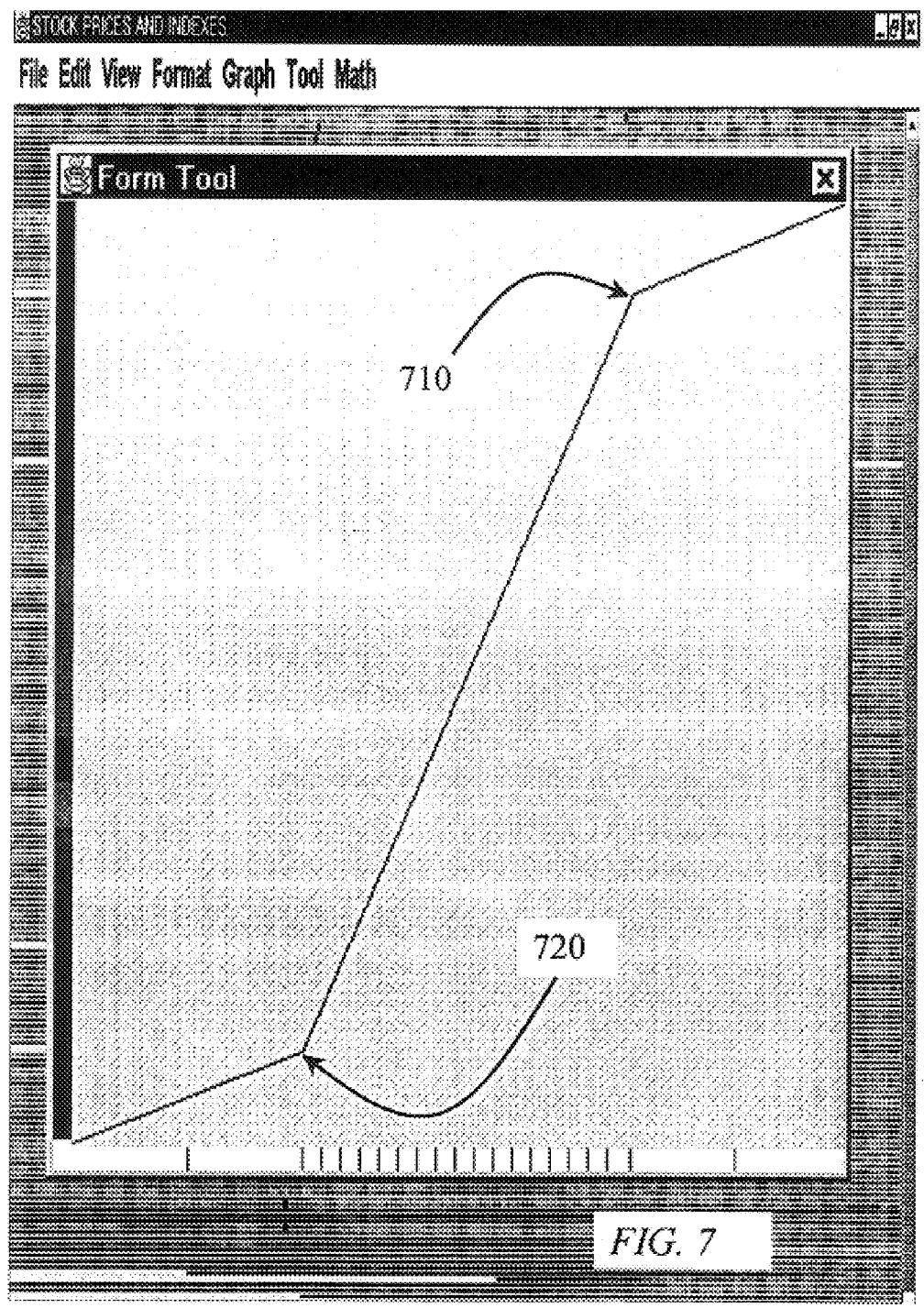
FIG. 7 is a screen display of the Form Tool used in the computer program of the present invention.

As a solution, the present invention provides a Form Tool, shown in FIG. 7, which is used to adjust and specify the number-to-color function. Combined with control of the color spectrum, the Form Tool of the invention provides powerful functionality in an easy to use interface. The number-to-color function in the invention is controlled by defining and changing subranges in the data range with each subrange mapped to a different color in the spectrum. The number of colors in the spectrum determine the number of subranges. The mapping can be a highly discretized (that is, to break a continuous range into a few discrete number of subranges) or nearly continuous (with the use of many colors and very small subranges). The mapping of a data subrange to color is a common approach to color mapping, the Form Tool of the present invention provides an innovative and powerful method to control and implement that process.

The Form Tool is implemented using a line graph display. In FIG. 7, the X-axis is the data range, separated into subranges, on the far left is $d_{Min}$, the minimum of the data set (subject to settings for direction and window), and on the far right of the range is $d_{Max}$, the maximum value. The Y-axis is the color spectrum. In the XY space is a function (one to one and onto except for a step form as will be described) mapping the continuous number range of the X-axis onto the colors of the Y-axis.

Changing the subranges mapped to color is implemented in two ways. In the first way the method changes the functional form of the number-to-color mapping using the Form Tool. In the second way, subranges are changed by extending or contracting the range of data used for the color mapping process as will be described below, retaining the functional form of the mapping. Both approaches are implemented through the Form Tool interface. Controls over the spectrum are also provided from within the Form Tool, for example to add more colors to an area of the spectrum, to change anchor colors in the palette, to change or set individual colors in the spectrum, or to set selected colors in the spectrum to the background color and hide the data in that respective subrange.

Assume a time series is to be color mapped and let a set of observations $A=\{a_1, a_2, \ldots, a_T\}$ be the subset of the data set (or data space) to be color mapped, determined by the direction and window setting. Let $d_{Min}$ be the minimum and $d_{Max}$ the maximum values of A. The data range: $[d_{Min}, d_{Max}]$ is the interval between and including those values. This range, or an extension or restriction of the range as explained below, is then input to the color mapping process to determine fill colors. The input to the color processes is defined by the interval $[c_{Min}, c_{Max}]$ and may be equal to or more or less than $[d_{Min}, d_{Max}]$. Control of the number-to-color function is implemented by adjusting the subrange size and distribution, by adjusting $[c_{Min}, c_{Max}]$, also by adding/removing colors from certain areas of the spectrum and by setting particular colors to particular numeric values as will be described.

Control and setting of the functional form needs to be easily perceived in its effect and easily controlled by an observer. It also needs to work with spectrums made of a few or many colors and spectrums which may be changed regularly. The control also needs to be such that the observer can easily pick out any area of data (contiguous or not) and adjust the controls to focus on that region. The control needs to be usable on any data range, and the adjustment be usable simultaneously on many different variables or data sets in the data space, even though they may be mapped number-to-color independently and be of many different range scales. To implement this, the control adjustment using the Form Tool can be specified to display the characteristics and take effect on just a single data set (single variable or time series), a group of data sets within the data space, or to take effect on all the data sets in the data space.

The implementation of the Form Tool begins with a linear map of the number range to the color spectrum. This generates equal sized subranges of the data range and each subrange is mapped to a different color in the spectrum with the spectrum aligned from low to high, this is the standard approach of prior art.

The Form Tool can be calibrated without any particular data range defined. It can also be calibrated with a particular variable selected, as will be described. Using functionality in the Form Tool certain colors can be set to certain numbers, colors set to alert values, or colors can be set or based on statistical characteristics of the data as will be described in detail below.

The Form Tool can also be used to provide information on a selected data set (time series or variable) or an area of the data space. The X-axis in the Form Tool can display the location of individual data points within the range of values. It can also display statistical measures of the data set (or of pooled data sets from the data space, including the entire data space) including the mean, median, and standard deviation and other measures of central tendency and variability, as well as a histogram of the values. Based on the histogram, the observer can manually change or can use a provided option to adjust the subrange sizes to reflect the location of the data observations in a nearest-neighbor subrange sizing (defining the subrange width as a certain number of observations), in effect putting the colors where the data is located.

Two types of adjustments to the subrange sizing can be made using the Form Tool. In the first method the functional form is changed without changing the boundaries of the color range. That is, the maximum and minimum used for color mapping calculations are the maximum and minimum of the data range: $[c_{Min}, c_{Max}]=[d_{Min}, d_{Max}]$. In the second method the maximum and minimum used for color mapping are varied from the maximum and minimum which define the data range. In some effects, for example, setting alerts as will be described, $[c_{Min}, c_{Max}]$ is extended beyond $[d_{Min}, d_{Max}]$. In other effects, for example, data slicing as will be described, the color range $[c_{Min}, c_{Max}]$, is reduced from the data range $[d_{Min}, d_{Max}]$.

FIG. 7 shows the Form Tool used to adjust the functional form without expanding the boundaries of the color range. The adjustment is made by moving a point(s) on the line using a mouse pointer or other input device. Any point on the line can be selected and dragged to a different location, changing the shape of the function. Movement of a point changes the number-to-color mapping. In the default setting, the piecewise components remain linear, but of different slopes (the piecewise components can also be set to exponential or logarithmic forms or polynomial approximation forms designed to match at the subrange boundaries as a spline function).

FIG. 7 shows a functional form moved to make an S shape. The S shape in the system default is created from linear piecewise components. Reference numeral 710 in FIG. 7 indicates the first point moved. The effect is to put all the data beyond an intercept point dropped to the X-axis from the final point 710, into two even sized subranges mapped to the two highest colors. Reference numeral 720 indicates the second point moved. The effect is to put all the data before an intercept dropped to the X-axis from the final point 720 into two even subranges mapped to the two lowest colors. The range between the intercepts is broken into even subrange sizes mapped to the remaining colors in the spectrum. The effect is to focus more colors into the central area of the data range. The Form Tool in a similar setting can be used to control for outliers, and many possible effects can be created of great utility.

In the default method the subranges in the piecewise components are determined to be evenly sized by the algorithm to divide the data range by the number of colors allocated. For example, in FIG. 7, the subranges in the middle of the data range are sized according to the algorithm to divide the data range between the intercept points dropped to the X-axis by the number of colors allocated.

The points moved on the function are, in the default, set to snap to a Y-axis grid projecting across the XY space. That is, the observer moves the boundaries of a color intercept with the functional form. The snap to option can be turned off and more general movement can be allowed. A restriction is that the form is constrained to keep a certain functional mapping. The observer can set the form to skip a color by indicating a vertical line or can skip a data range by a horizontal line, however the form is restricted not to bend back over itself.

Similarly to how the spectrum space can be stepped through or varied in a systematic way, the functional form of the color mapping can be set to step through a sequence of possible positions while the observer watches the changes interactively on the displayed space.

The Form Tool can also be used to adjust the color spectrum. In the first use, the number of colors in a given area of the spectrum (selected by the user) can be increased while retaining the color boundaries. In effect, it increases the number of colors in the selected area of the spectrum and reduces the subrange size mapped to those colors, providing for greater differentiation of values in those ranges. In this method two points are indicated in the spectrum on the left or Y-axis of the Form Tool and the number of colors between and including those selected colors is displayed. That number can be changed, for example increased, and the colors in that area of the spectrum are recalculated using the RGB combination of the two selected colors as described previously. In a second use, the Form Tool spectrum display can be used as an alternate to the Palette controls, by selecting and changing anchor colors on the Form Tool Y-axis. In a third use, the Form Tool spectrum colors can be selected and changed individually. In a standard use of this method, the Form Tool permits the selection of any color in the spectrum and that color to be set to the background color, in effect hiding the respective data subrange on the screen while leaving the space in the grid and not changing the color mapping. This is used for example in the option t o "Show Highs and Lows" by setting the middle colors of the spectrum to the background color but not recalculating the color mapping otherwise.

Making Number to Color Settings

In certain cases, the observer desires to fix a certain numeric value(s) (which may or may not be within the range of the data set being color mapped) to a certain color in the spectrum or to fix a range of values to a range of colors. Examples include to set zero to the middle of a color spectrum, to set the first value in a measurement period to the center of a color spectrum, to set the purchase price of a stock in a portfolio to the middle of the spectrum, to set an alert level or value to a certain color in a spectrum, and/or to set acceptable boundaries of a range to certain colors in a spectrum. Statistical moments of a data set can also be set to certain colors, for example, to set the mean to a certain color in the spectrum. The present invention provides two approaches to accomplish this end. In one approach, the Form Tool is used to change the functional form without expanding the color range as will be described. In the other approach, the range used for color mapping defined as the interval range $[c_{Min}, c_{Max}]$, is extended beyond the range of the data defined by the interval $[d_{Min}, d_{Max}]$.

The two approaches differ in terms of the effect on the number-to-color mapping function. Use of the Form Tool without changing the color boundaries generates a non-linear form (piecewise components may or may not be linear). On the other hand, the method of extending the range retains a linear number-to-color function across the data range. Extending the range comes with a cost, it increases the subrange sizes and then spreads the colors across the data set more "thinly". This can cause a loss of differentiation in the sense that two cells (values) which would have been distinct colors may now be filled with the same color.

To set a number to the center of a particular color by expanding the color range, the invention uses the following method. Let X be the number to be set to a certain color. Suppose the intention is to set the number to the middle of the spectrum (Set 0 to Center, Set Start to Center, Set Purchase Price to Center). Let $d_{Max}$ be the maximum in the data set (unique or not, and defined according to color direction and window settings) and $d_{Min}$ be the minimum. Let $c_{Min}$ and $c_{Max}$ be two values used to define and control the range of data input to the color mapping calculations to determine the fill color. $c_{Max}$ and $c_{Min}$ may be within the data range for certain purposes or outside of it, in this case, it will fall outside of the data range. Let X be the number to set to the center color. Assume M=15, the number of colors in the spectrum. Let B=abs($d_{Max}$-X) and C=abs($d_{Min}$-X), where the Euclidian metric can replace the absolute value function. Let D=max (B, C). Let E be the distance from the color set to the end of the color spectrum, in this case, where the number is set to the center of the middle color in a 15 color spectrum, it equals 7.5 colors. Then let F=D/E. Then set $c_{Max}$=X+F*E and $c_{Min}$=X-F*E. $[c_{Min}, c_{Max}]$ is the range used to determine the color mapping process and the fill colors in the data set are set as if $[c_{Min}, c_{Max}]$ were the data range. The number to set can also be set to the boundary of a color range rather than the center by adjusting the E value.

In a more general application, suppose the intention is to set a certain number X to the $P^{th}$ color in an M color spectrum. As an example, let X be the number to set to the P=12th color, assuming M=15 colors in the spectrum. Let B=abs($d_{Max}$-X) and C=abs($d_{Min}$-X). Let F be the distance from the $P^{th}$ color to the maximum color in the spectrum, in this case 3.5 (when set to the center of the color, numbers can also be set to the boundaries of a color or in a more general position), and let G be the distance to the minimum color, in this case 11.5 colors. Then let H=B/F and let J=C/G. Let K=max(H, J). Then $c_{max}$=X+K*F and $c_{Min}$=X-K*G.

This method retains a linear number-to-color mapping function but at a cost in terms of the use of some colors with little data (colors spread thinly). In an alternative approach to setting particular numbers to particular colors, the Form Tool can be used to make the setting directly by changing the functional form, without extending the color range beyond the data range.

To use the Form Tool to set a number to a particular color, an entry box is provided in the Form Tool below the data range X-axis. The box can be moved horizontally across the data range and any number entered in the box, setting the number to a color in the Form Tool linear mapping, for example, moving the entry box to the middle of the second subrange sets that number to be in the middle of the second color. As data is added to the data range, the position of the number is kept the same with reference to the color spectrum but the slope of the piecewise linear parts on both sides of that point are varied dynamically as the data set is changed or updated and new $d_{Min}$ and $d_{Max}$ values occur. The slope of the lines on both sides of the set point adjust independently to reach the $d_{Min}$ and $d_{Max}$ values.

In a similar way an alert value may be set to a certain color in a spectrum. The number of colors above and below the color set may be the same or, depending on the circumstance, more detail (more colors) may be allocated above that level or below it, depending on the particular area of interest.

In a related use, the interest is to set a range of numbers to certain colors, by defining two (boundary) number to color settings. An example of two number to color settings is to set Buy and Sell targets for a stock price, or to set Low and High for acceptable limits in health care vital statistics or in process measurements. To illustrate the ability to combine the color mapping processes to gain certain effects, the color spectrum control and the method to set numbers to colors will be combined in setting Buy and Sell values for a stock price (they could be any ordered pair of numbers). In this case, two number to color settings are used, more number to color settings can also be specified in a similar manner. Multiple number to color settings can be implemented in either of the same two ways for setting a number to a color: 1) using the Form Tool and changing the slopes of the piecewise defined number-to-color functional form, or 2) using the Form Tool interface to expand the color range beyond the data range.

In the method using the Form Tool to change the functional form while keeping the data and color range the same, suppose M=15 the number of colors in the spectrum in use. Suppose the interest is to set the lower limit (Buy) value to be the lower value of the subrange assigned to the $4^{th}$ color and to set the upper limit (Sell) to the upper value of the subrange assigned to the $12^{th}$ color. In some cases the interest is to have an extremely sharp distinction, that effect can be implemented by use of the Form Tool to set the $4^{th}$ and $13^{th}$ colors to distinct colors, different from other colors in the spectrum and not in the sequence of the spectrum (for example, with a primary spectrum, set them to white or black), or to change the brightness or intensity of the two colors. The effect of setting boundaries is to set and fix the slope of the line (or other functional form if selected) between the lower boundary of the $4^{th}$ and upper boundary of the $12^{th}$ colors. The Form Tool can be set without particular values for the data set, other than the Buy and Sell prices. Colors will be used only as values occur in the respective subrange, for example, if the data set input for color mapping does not contain a dmin value less than the Buy, then the lower 3 colors will not be used. If dmin values exist less than the Buy or as updates are added to the data set with such values, then the lower segment of the functional form slope adjusts to reach the dmin value. Likewise for the upper segment. As $d_{Min}$ and $d_{Max}$ change, for example with updates to the data set, the slope of the upper and lower segments adjusts dynamically. For example, FIG. 7 of the Form Tool shows a shape where the Buy value could be the lower limit of the middle section and the Sell value the upper limit of that section, fixing the slope of the line and subrange sizes between. FIG. 7 would exist if the distance from the Buy to $d_{Min}$, and Sell to $d_{Max}$ were the same (somewhat unusual) and were greater than what would exist if the slope in the middle section were to continue to those points. A similar method is used when more than two settings are to be made. The effect is to fix the subrange sizes in each piecewise segment defined, just as the slope is fixed between the Buy and Sell (upper and lower limits) described. The slope of the lines below the lowest color and above the highest color set adjust as was described.

To illustrate the method to implement two number to color settings by expanding the range, assume there are M=15 colors, and the intention is to set the lower limit (Buy) value to be the lower value of the subrange assigned to the $4^{th}$ color and to set the upper limit (Sell) to the upper value of the subrange assigned to the $12^{th}$ color, there are 3 colors less than the color set to Buy and 3 colors greater than the color set to the Sell value. Let B=abs($d_{Max}$-Sell), and let C=abs ($d_{Min}$-Buy) (or substitute the Euclidian metric). Let F be the number of colors to the max color, in this case 3 and let G be the number of colors to the min color, in this case also 3. Let Q be the number of colors in the segment of spectrum assigned to values between the limits Buy and Sell, in this case Q=M−F−G=15−3−3=9. Let H=B/F. Let J=C/G. Let O=(Buy−Sell)/Q. Let K=max (H, J, O). Then set $c_{Max}$=Sell+ K*F and $c_{Min}$=Buy−K*G. To set three number to color settings, calculate the range divided by the number of colors, similarly to H, J, and O and then take the maximum of all those values, the analog to K, and then use similar $c_{Max}$ and $c_{Min}$ formulas.

Remove or Hide Data

The color mapping and data space display is also affected by adding or removing data values, variables, categories of values or variables, or sets of variables from the data space. There are two general methods to remove data: static removal without recoloring, and a dynamic removal with recoloring on the new data space. Removed data cells can be kept in the data space grids or the space can be removed and the grids compressed.

For example, in some cases the observer wants to see only certain parts of the data ranges (e.g., Show Highs, Show Lows, Show Outliers). This can be accomplished by specifying certain number ranges or colors using the Form Tool interface. In either case, the colors of the data to be hidden are simply set to the background color. For example, outliers can be emphasized by setting all colors but the spectrum ends to the background color or by selecting to display fill colors only for data beyond plus or minus three standard deviations. The result sets all other colors (data) to the background color. In these approaches the color mapping is not recalculated and the data grid is not compressed, that is the cells for hidden values remain in the grid.

In some cases, the observer wishes to remove the space and compress the grid, for example, remove a variable (time series or row), and remove the corresponding cells from the grid.

Data Slicing

In the case to hide data described above, the color mapping was not recalculated, only certain parts were hidden. In other cases, the observer desires to remove certain values or variables from the data space and to recalculate the color mapping with those values or variables removed from the data set input to the color mapping. Values to be removed from the color set may be selected individually or by their color in the spectrum or data subrange in the Form Tool. For example, an observer may wish to slice down through the data. Peaks or troughs (extremes) in the data space are selected individually (using the right click menu and pointer), or by selecting their color from a display of the spectrum, or their data subrange in the Form Tool. The selected data is then removed from the data space for color mapping purposes. In the slice down implementation, space is left in the grid for the removed data and those cells set to the background color. This differs from the previous description of the method to hide data in that in the present case the data is also not included in the color mapping calculation. The effect is to allow the observer to slice off peaks of the data or remove certain areas (domains) of the data space, and to recolor with those values removed. The effect is to use the entire color spectrum to show the remainder of the data and generally allows better value differentiation in those areas. Space may or not be kept in the grid for the successively filtered cells. The observer can select individual cells or values, rows, columns, or areas of the data space to be removed.

Retrospective and Animated Color Mapping

The present invention supports two modes of color mapping, selected in step 350 of FIG. 3. One method is "retrospective", based on an unchanging data space. The other provides a unique "animated" mode which allows the specification of a point in the past and the unfolding of the data and color map from that time forward. The animated mode is also at use in the case of monitoring real-time, updating data.

Retrospective color is a map of the data space (subject to the color process controls for spectrum, direction, window, function, and number to color settings) as a static entity. Movement through that data space is then over a static field of colors, for example a retrospective view of historical data.

The animated method is the dynamic recoloring of data in a recursive basis from a point in past (in the historical unfolding of time) or in the real time monitoring of updating data. The animated view recolors each time a new data point is added to the data sets in the data space. For a historical data set, a point in the past is specified as the start point and a rate of update specified. The display begins with the data from the first available point up through the specified start point and that space is color mapped and displayed. Data is then added recursively, a point at a time according to the rate of update. The data space is recolored each time a point or observation is added. This allows a view of the color mapping as if time unfolded from a selected starting point in the past. The same mode is used to monitor real time updating data, the color mapping is recalculated each time a new data point becomes available. In the animate mode, the cell sizing is generally fixed, that is, the algorithm for automatic cell sizing, as was described, is turned off. The cell size, in animation, can be fixed to a size set by the observer, or is set based on the number of rows in the data space so as to fill the vertical dimension of the available display area.

Mathematical Transfromations

The computer program includes controls for the use of mathematical functions and algorithms to sort, separate, and transform the data space as indicated in step 360 of FIG. 3. These controls are used interactively while the data space is displayed on the screen.

One mathematical function is the sorting of a data space or area of the data space. A number of methods are used in the present invention. Sorting can apply to all the data variables (time series) in the data space, on an area or category of the data space (for example, stocks by sector or data variables matching some criteria). Sorting can be based on a single time point, for example, by the values in a selected column, a straight rank sort. This can be based on data in the data space, for example, sort by price on X date, or by other criteria calculated for the data space, for example criteria commonly used in finance, for example, sort by Beta. A dynamic sorting is implemented which can sort based on the most current column in updating data and dynamically resorts the data space as observations are added.

In some cases, the observer desires to sort the data space according to similar color patterns (similar data movements) over a specified period of time. This is accomplished by use of statistics like correlation or covariance and by other categorizing, classification, and grouping techniques described in the statistics literature. In one method implemented in the invention, it is accomplished by calculating the pairwise correlation between each row or series in the data space over a selected time domain with a line with positive slope having the same domain. The data space is then sorted or reordered based on the resultant values in an ascending or descending order. In another approach, the sort is accomplished by sorting the data with respect to a reference series. For example, the question of which stock prices move like the Dow Jones Index (DJI) is answered by calculating the pairwise correlation (over the entire data space or a selected domain) between each stock price in the data space and the DJI. The rows are then sorted based on that value, typically in a descending order with the DJI at the top. These approaches readily show and sort the color patterns. Other functions can also be input as the sort criteria, particularly variance and standard deviation (sort by volatility).

The data space can also be transformed with more general mathematical functions as described in U.S. Pat. No. 4,954,981 Dehner, Jr., et al., hereby incorporated by reference. A single variable, a set of variables, or all variables in the data space or a section of the space can be selected as inputs to a selected function. Formulas of time series can be built combining basic operators including lead and lag operators. The results can be made a new space in addition to the old (a different frame or different grid in three dimensional effect), for example one frame or grid with the raw data, another with percentage change, another with the moving correlation (as described in Dehner, Jr., et al. cited above) between each series (stock price) and the DJI. The results can also be selected to replace the old space or can be appended to it at the end or inserted at certain locations. The option is available to color map the new space or results under the current color process settings (spectrum, direction, window, and number-to-color function) or under different and separate color process settings.

Movement Through the Data Space

Once a grid has been selected, populated with data, and color mapped, the computer program permits an observer to move over and through the data space, as indicated in step 370 of FIG. 3. Controls are available to move the observer position over and through the data space and to move beyond the visible limits of the screen, in effect accessing and visualizing a virtually unlimited data space. Perspective and movement settings enable and support the sense of "flying" through a three dimensional data space (over a space, into a three dimensional grid or a cylinder).

Both horizontal movement over a data space and through time (across the XY plane) as well as vertical movement (altitude or closeness to the grid) are implemented, and the two can be combined in simultaneous vertical and horizontal motion. Horizontal movement over or through a data a space is accomplished by removing and adding cells to the display to support the direction of the motion (either without changing the color mapping, or by dynamically recoloring based on the data on the screen according to the motion indicated). Vertical movement is accomplished by increasing or decreasing the size of the cells on the screen to support a zoom in/out or an altitude effect, while maintaining any perspective and three dimensional effects. Both horizontal and vertical movements can be combined and implemented with input devices, for example a joy stick, or combined mouse or keyboard controls.

In order to scroll or fly rapidly over a data space, two methods are implemented in computer memory. Which method is active depends on the amount of data in the data space, the level of zoom or altitude setting, and the amount of processor memory available. Moving over a retrospective data space, if the amount of data is relatively small, the entire image for all available data is calculated and stored in computer memory and the part of the current view selected by the observer is shown on the screen. This makes for very fast motion, as no mathematically intensive color calculations are required to support movement. However, if the amount of data is very large, the memory required to store an entire image of the data space may be greater that the computer configuration (a program configuration setting can be used to change the division point or the program can evaluate processor memory available). In this case, just the area of the display, or the display plus a small boundary, is color calculated and stored in memory, and the part in view displayed on the screen. As movement is indicated and a new area of the data space is required, that part is calculated, stored, and displayed as needed.

Two types of movement are supported according to the whether a focus point in a grid is fixed or moving as was previously described. In the first case the observer point scrolls or flies over a fixed data space, with the perspective and focus fixed. In the second, the focus point and perspective changes and travels with the observer as they move through the data space.

Movement of the pointer over the data space displays titles as described earlier in the section Data Grids, Perspective, and Three Dimensional Effects. As described, if the setting Walk-about is selected, motion with a cursor click or joystick pressure is one step at a time in the direction selected.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A computer-implemented method for simultaneously displaying a plurality of time series, comprising the steps of:
   (a) creating a virtual data space including a set of data and at least one display grid where time is an axis,
   (b) creating a color spectrum made of a plurality of colors,
   (c) mapping the data in the data space to the colors in the color spectrum with a number-to-color mapping procedure which includes the ability to select at least one subset of the data space to color map with an independent number-to-color mapping procedure, and
   (d) displaying the color-mapped data space on a monitor.

2. The method as set forth in claim 1, step (a) including the step of creating three dimensional effects from at least one two dimensional data grid.

3. The method as set forth in claim 1, step (a) including the step of moving an observer position over and through the data space which can extend beyond a horizon of the screen display.

4. A computer-implemented method for simultaneously displaying a plurality of time series, comprising the steps of:
   (a) creating a virtual data space including a set of data and at least one display grid where time is an axis,
   (b) creating a color spectrum made of a plurality of colors,
   (c) mapping the data in the data space to the colors in the color spectrum with a number-to-color mapping procedure which includes the ability to select subsets of the data space to color map independently, and
   (d) displaying the color-mapped data space on a monitor step (b) including the steps of:
      (i) specifying a number of colors to make up an ordered color spectrum,
      (ii) selecting at least three anchor colors for a palette from which to build the spectrum,
      (iii) setting the anchor colors at certain locations within the color spectrum to generate a plurality of areas within the data spectrum, defined by the space between the anchor colors, and
      (iv) generating spectrum colors as combinations of the anchor colors and allowing more colors to be defined in one area than another.

5. The method as set forth in claim 1, step (b) including the step of specifying and controlling a background color and hiding a data cell in a data grid by setting a fill color for that cell to the background color.

6. A computer-implemented method for simultaneously displaying a plurality of time series, comprising the steps of:
   (a) creating a virtual data space including a set of data and at least one display grid where time is an axis,
   (b) creating a color spectrum made of a plurality of colors,
   (c) mapping the data in the data space to the colors in the color spectrum with a number-to-color mapping procedure which includes the ability to select subsets of the data space to color map independently, and
   (d) displaying the color-mapped data space on a monitor step (c) including the step of setting a functional form of the number to color mapping using an interactive tool which adjusts the functional form by defining piecewise components of the functional form where the piecewise components are polynomial functions.

7. The method as set forth in claim 1, step (c) including the step of defining different areas in the data space to color map under different color process controls.

8. A computer-implemented method for simultaneously displaying a plurality of time series, comprising the steps of:
   (a) creating a virtual data space including a set of data and at least one display grid where time is an axis,
   (b) creating a color spectrum made of a plurality of colors,
   (c) mapping the data in the data space to the colors in the color spectrum with a number-to-color mapping procedure which includes the ability to select subsets of the data space to color map independently, and
   (d) displaying the color-mapped data space on a monitor step (c) including the step of selecting a direction along the data space in which to map each set of data in that direction independently.

9. The method as set forth in claim 1, step (c) including the step of selecting a window domain of a data set, which is less than the total data available, and color mapping that window of data independently.

10. A computer-implemented method for simultaneously displaying a plurality of time series, comprising the steps of:
    (a) creating a virtual data space including a set of data and at least one display grid where time is an axis,
    (b) creating a color spectrum made of a plurality of colors,
    (c) mapping the data in the data space to the colors in the color spectrum with a number-to-color mapping procedure which includes the ability to select subsets of the data space to color map independently, and
    (d) displaying the color-mapped data space on a monitor step (c) including the step of recalculating the color mapping in a recursive method with the addition of new data values.

11. A computer program stored on a computer-readable memory device for directing a computer to operate as follows:

constructing a virtual data space by receiving a user-selected set of data and a user-selected grid form and then populating the grid form with the data;

creating a color spectrum based on a user selected plurality of colors;

mapping the data in the data space to the colors in the color spectrum with a number-to-color mapping procedure which includes the ability to select at least one subset of the data space to color map with an independent number-to-color mapping procedure, and displaying the color-mapped data space on a monitor coupled with the computer.

12. The computer program as set forth in claim 11, the constructing a data space step including the step of creating three dimensional effects from at least one two dimensional data grid.

13. The computer program as set forth in claim 11, the constructing a data space step including the step of moving an observer position over and through the data space which can extend beyond a horizon of the screen display.

14. A computer program stored on a computer-readable memory device for directing a computer to operate as follows:

constructing a virtual data space by receiving a user-selected set of data and a user-selected grid form and then populating the grid form with the data;

creating a color spectrum based on a user selected plurality of colors;

mapping the data in the data space to the colors in the color spectrum with a number-to-color mapping procedure which includes the ability to select subsets of the data space to color map independently, and displaying the color-mapped data space on a monitor coupled with the computer, the creating a color spectrum step including the steps of:

specifying a number of colors to make up an ordered color spectrum, selecting at least three anchor colors for a palette from which to build the spectrum, setting the anchor colors at certain locations within the color spectrum to generate a plurality of areas within the data spectrum, defined by the space between the anchor colors, and generating spectrum colors as combinations of the anchor colors and allowing more colors to being defined in one area than another.

15. The computer program as set forth in claim 11, the creating a color spectrum step including the step of specifying and controlling a background color and hiding a data cell in a data grid by setting a fill color for that cell to the background color.

16. A computer program stored on a computer-readable memory device for directing a computer to operate as follows:

constructing a virtual data space by receiving a user-selected set of data and a user-selected grid form and then populating the grid form with the data;

creating a color spectrum based on a user selected plurality of colors;

mapping the data in the data space to the colors in the color spectrum with a number-to-color mapping procedure which includes the ability to select subsets of the data space to color map independently, and displaying the color-mapped data space on a monitor coupled with the computer, the mapping the data step including the step of setting a functional form of the number to color mapping using an interactive tool which adjusts the functional form by defining piecewise components of the functional form where the piecewise components are polynomial functions.

17. The computer program as set forth in claim 11, the mapping the data step including the step of defining different areas in the data space to color map under different color process controls.

18. A computer program stored on a computer-readable memory device for directing a computer to operate as follows:

constructing a virtual data space by receiving a user-selected set of data and a user-selected grid form and then populating the grid form with the data;

creating a color spectrum based on a user selected plurality of colors;

mapping the data in the data space to the colors in the color spectrum with a number-to-color mapping procedure which includes the ability to select subsets of the data space to color map independently, and displaying the color-mapped data space on a monitor coupled with the computer, the mapping the data step including the step of selecting a direction along the data space in which to map each set of data in that direction independently.

19. The computer program as set forth in claim 11, the mapping the data step including the step of selecting a window domain of a data set, which is less than the total data available, and color mapping that window of data independently.

20. A computer program stored on a computer-readable memory device for directing a computer to operate as follows:

constructing a virtual data space by receiving a user-selected set of data and a user-selected grid form and then populating the grid form with the data;

creating a color spectrum based on a user selected plurality of colors;

mapping the data in the data space to the colors in the color spectrum with a number-to-color mapping procedure which includes the ability to select subsets of the data space to color map independently, and displaying the color-mapped data space on a monitor coupled with the computer, the mapping the data step including the step of recalculating the color mapping in a recursive method with the addition of new data values.

* * * * *